United States Patent [19]
Hirayanagi et al.

[11] Patent Number: 5,865,283
[45] Date of Patent: Feb. 2, 1999

[54] TORQUE CONVERTER WITH A LOCK-UP MECHANISM

[75] Inventors: Tsuyoshi Hirayanagi, Fukuroi; Shigeki Umezawa, Kakegawa, both of Japan

[73] Assignee: NSK-Warner K.K., Tokyo, Japan

[21] Appl. No.: 629,801

[22] Filed: Apr. 9, 1996

[30] Foreign Application Priority Data

Apr. 14, 1995 [JP] Japan .................................. 7-089345

[51] Int. Cl.$^6$ ................................................. F16H 45/02
[52] U.S. Cl. ................ 192/3.29; 192/107 R; 192/113.36
[58] Field of Search ............... 192/3.29, 113.36, 192/107 R

[56] References Cited

U.S. PATENT DOCUMENTS

| | | | |
|---|---|---|---|
| 4,986,397 | 1/1991 | Vierk ............................... | 192/113.36 X |
| 5,456,343 | 10/1995 | Murata et al. ........................ | 192/3.29 |
| 5,501,309 | 3/1996 | Walth et al. ...................... | 192/113.36 X |
| 5,605,210 | 2/1997 | Koike et al. ........................ | 192/3.29 |
| 5,738,198 | 4/1998 | Walth et al. ........................ | 192/113.36 |

FOREIGN PATENT DOCUMENTS

| | | | |
|---|---|---|---|
| 57-140920 | 8/1982 | Japan .................................. | 192/3.29 |
| 58-30532 | 2/1983 | Japan ................................ | 192/113.36 |
| 1-128057 | 8/1989 | Japan . | |
| 4-347046 | 12/1992 | Japan .................................... | 192/3.29 |
| 5-99297 | 4/1993 | Japan . | |
| 6-346951 | 12/1994 | Japan . | |

*Primary Examiner*—Rodney H. Bonck
*Attorney, Agent, or Firm*—Shapiro and Shapiro

[57] ABSTRACT

In a torque converter with a lock-up mechanism which can decrease a distribution of hydraulic pressure in the radial and circumferential directions of a frictional material, which can prevent the creation of any excess reaction by the distribution of hydraulic pressure, and which can efficiently give a fastening force to the frictional material to thereby improve transmission torque capacity, an oil groove for reducing the distribution of hydraulic pressure is provided on the frictional material or a piston. This oil groove is provided for depressurization at a location which does not hinder the fastening function.

5 Claims, 9 Drawing Sheets

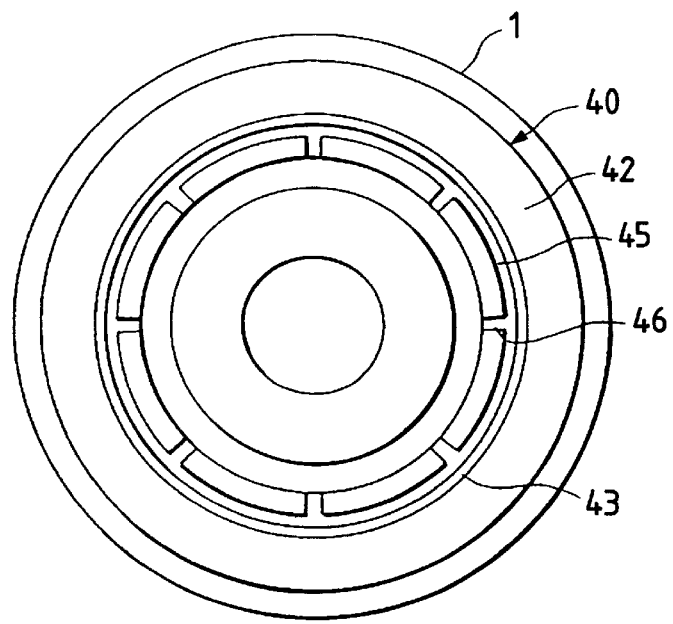
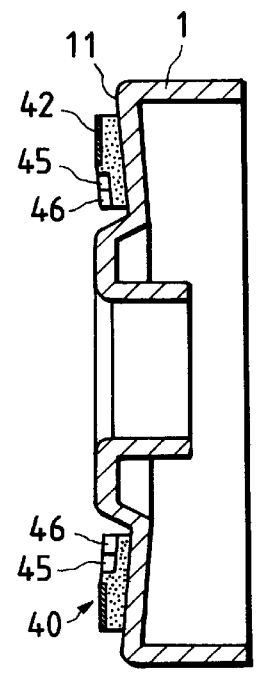
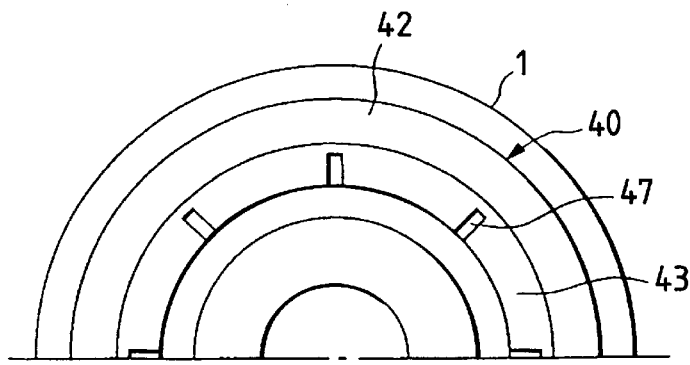
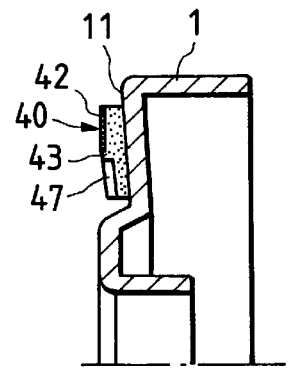

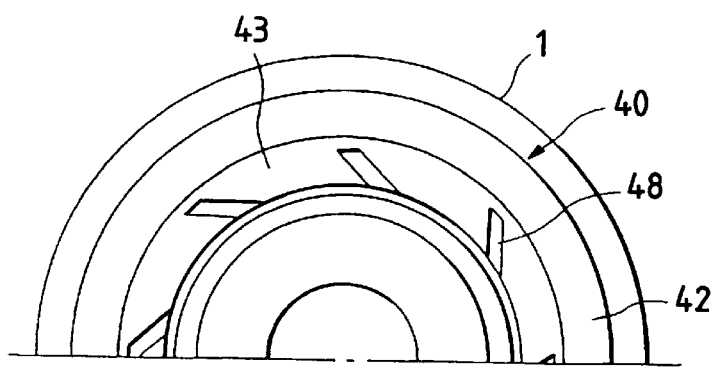
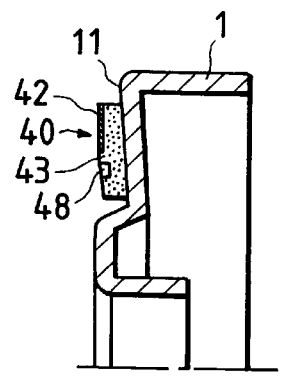
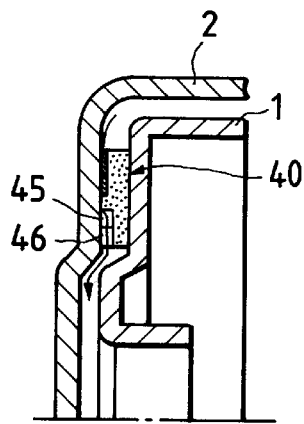

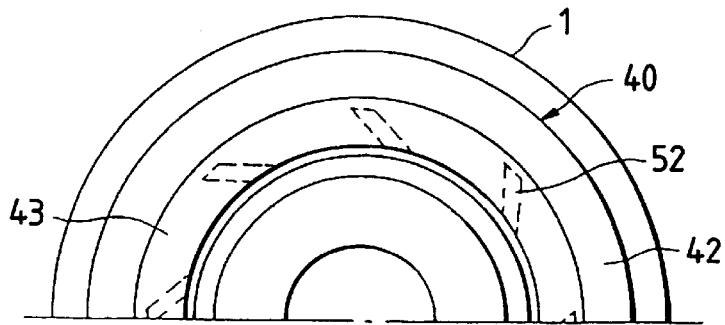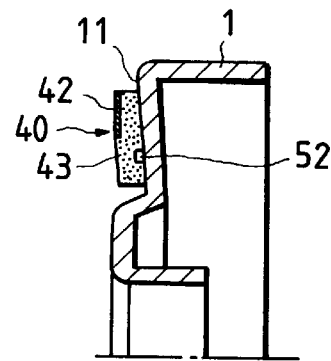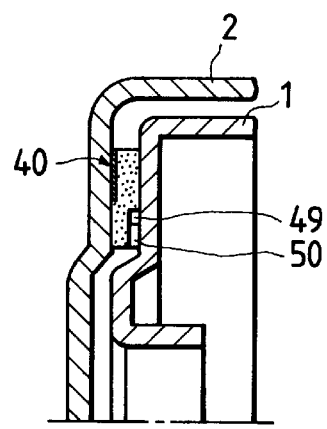

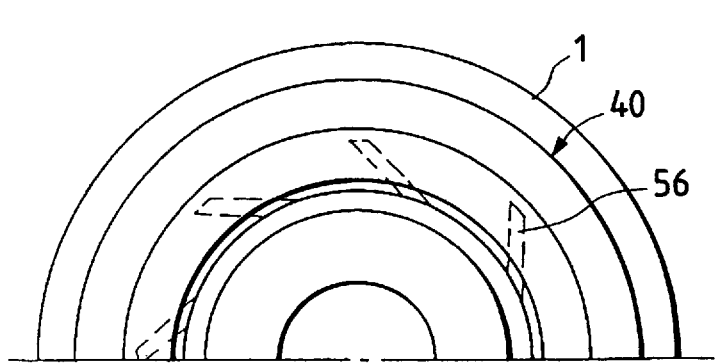
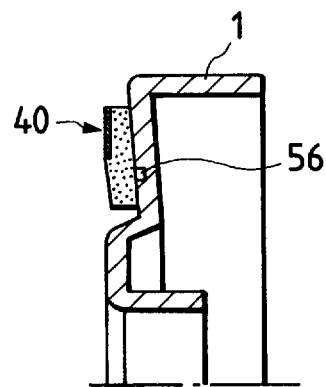
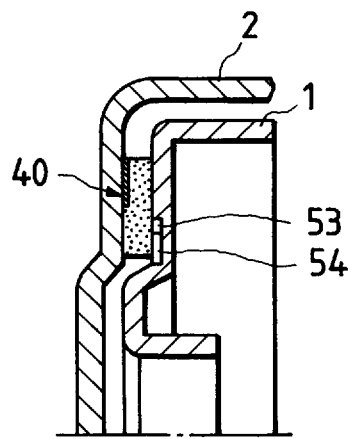

TORQUE CONVERTER WITH A LOCK-UP MECHANISM

BACKGROUND OF THE INVENTION

1. Field of the Invention

This invention relates to a torque converter with a lock-up mechanism in an automatic transmission for a vehicle. More particularly, it relates to a torque converter with a lock-up mechanism which can achieve an improvement in transmission torque capacity by a simple construction and can prevent vibration (judder) created by stick-slip.

2. Related Background Art

Generally, a torque converter can realize smooth running because it transmits power through a fluid, while it suffers from the disadvantage that fuel consumption is aggravated because of the energy loss due to the slip of the fluid. In order to overcome this, the latest torque converters are provided with a lock-up mechanism.

The lock-up mechanism is a mechanism which comprises a direct-coupled clutch (lock-up clutch) and in which when the speed of vehicle reaches a predetermined or higher speed, the flow of the fluid in the torque converter automatically changes to urge the friction surface of a frictional material attached to the piston of the direct-coupled clutch against the front cover of the torque converter to thereby directly couple an engine and a drive wheel together. Thereby, the influence of the slip of the fluid is eliminated and therefore, an improvement in fuel consumption can be achieved.

When the piston (lock-up piston) of the direct-coupled clutch is fastened to the front cover of the torque converter, a pressure force by hydraulic pressure is acting on the sliding portion, between the friction surface of the frictional material attached to the piston and the front cover. To keep the fastened state of the piston and the front cover in the sliding portion good, it is necessary to increase the pressure force by the hydraulic pressure. Accordingly, in the fastened state, high pressure is being applied to the frictional material.

When the pressure force becomes higher, excess reaction due to the distribution of the hydraulic pressure becomes greater thereby and the possibility of imparting an adverse effect to the fastened state of the friction surface of the piston and the front cover becomes high and therefore, as a countermeasure for preventing this, it has been practiced to form a groove in the surface of the frictional material as described in Japanese Laid-Open Utility Model Application No. 1-128057 or to form a groove in the surface of the piston as described in Japanese Laid-Open Patent Application No. 6-346951.

In recent years, it has often been the case that slip control is adopted for the lock-up clutch with a view to improve fuel consumption, but judder vibration occurs during slip. Therefore, it is necessary to prevent judder vibration and as a measure for preventing it, it is practiced to subject the friction surface of the lock-up clutch to a predetermined amount of cutting work and in addition, use low ps oil to make $\mu$-V characteristic into a positive gradient (note: a negative gradient would cause judder vibration).

Such an example is described, for instance, in Japanese Laid-Open Patent Application No. 5-99297. FIGS. 23 and 24 of the accompanying drawings are views for illustrating this example of the prior art, and an annular frictional material 140 is attached to the front cover side of the piston 100 of a lock-up clutch, and as shown in FIG. 24, the surface of the frictional material 140 from the radially outer peripheral edge portion A thereof to the intermediate point B thereof is subjected to cutting work between the outer peripheral edge portion A and the inner peripheral edge portion C. In FIG. 23, it is an annular area 130. By doing so, any stick-slip occurring during the liberation and fastening of the lock-up clutch can be prevented.

In the above-described construction, however, when the engagement hydraulic pressure changes from low pressure to high pressure, the area of contact and Rm (average effective radius) become smaller as the manner of bearing of the friction surface shifts from the bearing against the outer diameter to the bearing against the inner diameter (see FIG. 25 of the accompanying drawings). That is, by the hydraulic pressure coming round from the outer peripheral portion of the frictional material into between the friction surfaces as indicated by arrow in FIGS. 25 and 26 of the accompanying drawings, a distribution of hydraulic pressure is created radially and circumferentially of the frictional material 140 to thereby reduce the piston thrust which brings the piston 100 into pressure contact with the front cover 200. Accordingly, due to these factors, there has arisen the problem that during high hydraulic pressure, transmission torque capacity is reduced (see FIG. 26). FIG. 25 shows the manner in which during low hydraulic pressure, the frictional material 140 bears against the front cover 200 on the outer diameter side, and FIG. 26 shows the manner in which during high hydraulic pressure, the frictional material 140 bears against the front cover 200 on the inner diameter side.

The countermeasure by the above-described construction is effective for the prevention of judder, but may result in a reduction in the transmission torque capacity during high hydraulic pressure. As measures for improving the transmission torque capacity, it would occur the diameter of the clutch larger, to construct the clutch of multiple plates and to increase the hydraulic pressure, but this would conversely make the structure of the lock-up clutch complicated and bulky and still, would result in an increase in fuel consumption.

For such a reason, it has heretofore been very difficult to prevent any reduction in the transmission torque capacity during high hydraulic pressure by a combination of a lock-up clutch having its friction surface subjected to a set amount of cutting work and low $\mu s$ oil.

When a pressure force becomes high, the excess reaction due to the distribution of hydraulic pressure also becomes great, and this may adversely affect the joined state of the friction surface of the piston and the front cover and also may impart damage such as deformation to the torque converter itself.

Particularly, it is important to decrease the distribution of hydraulic pressure and increase the piston thrust in order to prevent any reduction in transmission torque capacity during the operation of the lock-up clutch at high hydraulic pressure.

SUMMARY OF THE INVENTION

Consequently, it is the object of the present invention to provide a torque converter with a lock-up mechanism which can efficiently decrease a distribution of hydraulic pressure in the radial direction and circumferential direction of a frictional material created by hydraulic pressure coming around from the outer peripheral portion of the frictional material into and between the friction surfaces and can prevent the creation of any excess reaction due to the distribution of hydraulic pressure and can efficiently give a fastening force to the frictional material even during high hydraulic pressure to thereby improve the necessary transmission torque capacity even during high pressure.

To achieve the above object, the torque converter of the present invention can be a torque converter with a lock-up mechanism provided with a direct-coupled clutch displaceable between a fastened state and a liberated state and slip-controllable, and a torque converter body for transmitting power by a fluid, characterized in that a frictional material is fixed to an axial pressure contact surface of the piston of a direct-coupled clutch, a friction surface of a radially outer portion of the frictional material has been subjected to cutting work, and hydraulic pressure distribution reducing means for reducing a distribution of hydraulic pressure created around the frictional material is provided on a radially inner portion of the frictional material which has not been subjected to cutting work.

Since the friction surface of the frictional material in the radially outer portion thereof is subjected to cutting work and the hydraulic pressure distribution reducing means for reducing the distribution of hydraulic pressure created around the frictional surface is provided on the radially inner portion of the frictional material which is not subjected to cutting work, the distribution of hydraulic pressure in the radial direction and circumferential direction of the frictional material created by hydraulic pressure coming a round from the outer peripheral portion of the frictional material into and between the friction surfaces is decreased during the operation of the lock-up clutch at high hydraulic pressure to thereby increase the piston thrust. As a result, it becomes possible to prevent any reduction in transmission torque capacity during high hydraulic pressure.

BRIEF DESCRIPTION OF THE DRAWINGS

FIG. 2 is a front view of a piston 1 having a frictional material 40 attached thereto showing a first embodiment of the present invention.

FIG. 3 is an axial cross-sectional view of the piston 1 having the frictional material 40 attached thereto showing the first embodiment of the present invention.

FIG. 4 is a front view of a piston 1 having a frictional material 40 attached thereto showing a second embodiment of the present invention.

FIG. 5 is an axial cross-sectional view of the piston 1 having the frictional material 40 attached thereto showing the second embodiment of the present invention.

FIG. 6 is a front view of a piston 1 having a frictional material 40 attached thereto showing a third embodiment of the present invention.

FIG. 7 is an axial cross-sectional view of the piston 1 having the frictional material 40 attached thereto showing the third embodiment of the present invention.

FIG. 8 is an axial cross-sectional view showing the state of a lock-up clutch in the first embodiment shown in FIGS. 2 and 3 during high hydraulic pressure.

FIG. 13 is a front view of a piston 1 having a frictional material 40 attached thereto showing a sixth embodiment of the present invention.

FIG. 14 is an axial cross-sectional view of the piston 1 having the frictional material 40 attached thereto showing the sixth embodiment of the present invention.

FIG. 15 is an axial cross-sectional view showing the state of a lock-up clutch in the fourth embodiment shown in FIGS. 9 and 10 during high hydraulic pressure.

FIG. 20 is a front view of a piston 1 having a frictional material 40 attached thereto showing a ninth embodiment of the present invention.

FIG. 21 is an axial cross-sectional view of the piston 1 having the frictional material 40 attached thereto showing the ninth embodiment of the present invention.

FIG. 22 is an axial cross-sectional view showing the state of a lock-up clutch in the seventh embodiment shown in FIGS. 16 and 17 during high hydraulic pressure.

DESCRIPTION OF THE PREFERRED EMBODIMENTS

Figure 1:
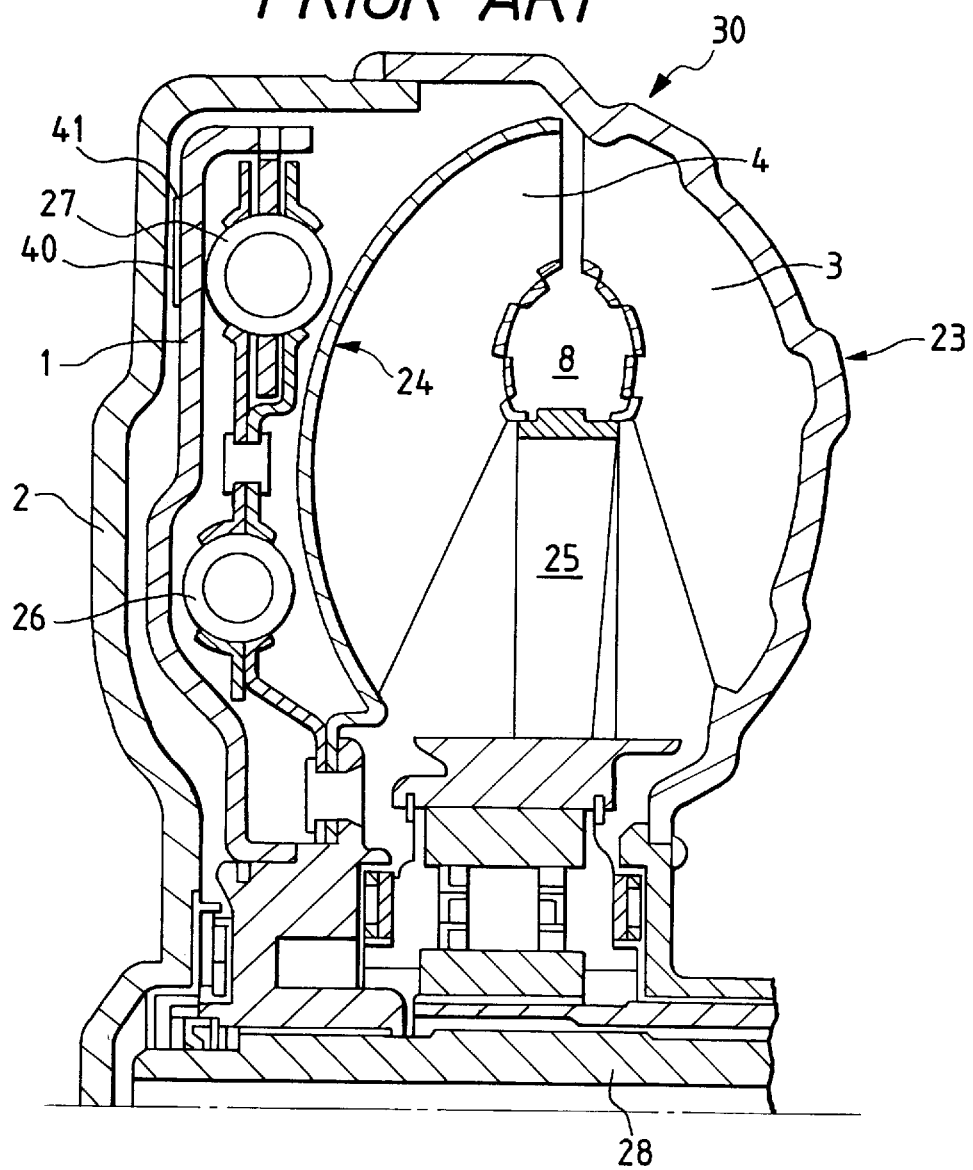
FIG. 1 is an axial cross-sectional view of a torque converter with a lock-up mechanism to which each embodiment of the present invention can be applied.

Each embodiments of the present invention will hereinafter be described in detail with reference to the accompanying drawings throughout which like portions are designated by like reference numerals.

FIG. 1 is an axial cross-sectional view of a torque converter 30 to which each embodiment of the present invention can be applied, which is shown in the liberated state of a direct-coupled clutch. The torque converter 30 comprises a front cover 2 forming a part of the housing of the torque converter 30, an impeller 23 which is a doughnut-shaped vane wheel fixed to the front cover 2, a turbine 24 which is a doughnut-shaped vane wheel having vanes opposed to the vanes of the impeller 23, and a stator 25 rotatably provided between the impeller 23 and the turbine 24. The impeller 23, the turbine 24 and the stator 25 together constitute a torque converter body.

The impeller 23 is connected to the crank shaft of the engine of a vehicle, not shown, and is rotated with the rotation of the engine together with the front cover 2. The turbine 24 is directly coupled to an output shaft 28 and is connected to a wheel, not shown, through a transmission mechanism, not shown. The stator 25 is in a form sandwiched between the impeller 23 and the center of the inner periphery of the turbine 24 and has the function of changing the flow of a fluid filling the interior of the torque converter 30. The piston (lock-up piston) of a direct-coupled clutch which is a circular ring-shaped plate effecting piston movement having a frictional material 40 adhesively attached and fixed to the surface thereof opposed to the inner surface of the front cover 2 is provided between the inner surface of the front cover 2 and the outer surface of the turbine 24, and is rotated with the output shaft 28. The friction surface of the frictional material 40 is opposed to the inner surface of the front cover 2. An annular member 41 is joined to the radially outer portion of the frictional material 40.

Between the outer surface of the turbine 24 and the piston 1, there is provided a damper mechanism comprising coil springs 26 and 27 in order to alleviate the shock when the piston 1 has been fastened. Also, a central space 8 is defined at the center of the torque converter 30.

The operation of the piston 1 will now be described. When the speed of the vehicle reaches a predetermined or higher speed, it is feedback-controlled by a control mechanism, not shown, and the flow of the fluid in the torque converter 30 defined by the impeller 23 and the turbine 24 automatically changes. By the change, the piston 1 is urged against the inner surface of the front cover 2 and the frictional material 40 of the piston 1 is joined to the inner surface of the front cover 2, and the piston 1 becomes directly coupled, whereby the drive force of the engine is directly transmitted to the output shaft 28. Accordingly, the drive side and the output side are mechanically connected (directly coupled) together without the intermediary of the fluid and therefore, fluid loss can be prevented and fuel consumption can be improved.

The torque converter 30 is connected to a hydraulic control mechanism, not shown, which changes, namely, increases or decreases the flow rate of oil while keeping the pressure difference between the front and rear of the piston 1 substantially constant in order to maintain the slip state of the direct-coupled clutch, namely, by keeping a substantially constant pressure difference between the two oil paths on the opposite sides of the piston 1, i.e., the outer peripheral side and the inner peripheral side of the piston.

FIGS. 2 and 3 are a front view and an axial cross-sectional view, respectively, of a piston 1 having a frictional material 40 attached thereto showing a first embodiment of the present invention. An annular frictional material 40 formed of a porous material or the like is attached and fixed, by a predetermined adhesive agent, to the annular surface 11 of the piston 1 which is opposed to the front cover 2 (see FIG. 1).

That surface of the frictional material 40 which is adjacent to the front cover 2 is divided into an annular cut surface 42 (flat surface) having its outer diameter portion subjected to cutting work, and an annular non-cut surface 43 (inclined surface) having its inner diameter portion not subjected to cutting work. The construction in which the frictional material 40 has the cut surface 42 and the non-cut surface 43 is common to each embodiment which will hereinafter be described. Accordingly, it need not be described in a second and subsequent embodiments.

The non-cut surface 43 is formed with a circumferentially continuously extending oil groove 45 and a plurality of oil grooves 46 connected to and communicating with the oil groove 45 and radially inwardly extending to the inner diameter edge portion of the frictional material 40. The oil grooves 46 comprise eight grooves formed radially and circumferentially equidistantly, but of course, the number thereof can be set arbitrarily. Also, the radial width of the oil groove 45 and the circumferential width and radial length of the oil grooves 46 can of course be set arbitrarily as required.

FIG. 8 is an axial cross-sectional view showing the state of the lock-up clutch in the first embodiment shown in FIGS. 2 and 3 during high hydraulic pressure. As shown, during high hydraulic pressure, the frictional material 40 bears against the front cover 2 with the inner diameter side thereof as the center. At this time, by the oil grooves 45 and 46 being provided, the distribution of hydraulic pressure in the radial direction and circumferential direction of the frictional material 40 created by hydraulic pressure coming around from the outer peripheral edge portion of the frictional material 40 to the friction surface between the front cover 2 and the frictional material 40 can be decreased during the operation (fastening) of the lock-up clutch at high hydraulic pressure. Accordingly, the piston thrust is increased. As a result, it becomes possible to prevent any reduction in transmission torque capacity during high hydraulic pressure. In other words, these oil grooves 45 and 46 are provided for depressurization at locations which do not hinder the fastening function of the lock-up clutch during the operation thereof. This holds true in each embodiment which will hereinafter be described.

The oil grooves 45 and 46 do not extend in the cut surface 42 of the friction surface which is subjected to cutting work. Accordingly, the deficiency of the quantity of oil on the friction surface and the fluctuation of hydraulic pressure do not result during slip control and therefore, it is possible to maintain conventional heat resistance and judder resistance.

FIGS. 4 and 5 are a front view and an axial cross-sectional view, respectively, of a piston 1 having a frictional material 40 attached thereto showing a second embodiment of the present invention. FIGS. 4 and 5 both show only one side of the piston 1 (cut in half at the center). As in the first embodiment, an annular frictional material 40 formed of a porous material or the like is attached and fixed, by a predetermined adhesive agent, to the annular surface 11 of the piston 1 which is opposed to the front cover 2 (see FIG. 1).

A non-cut surface 43 is formed with a plurality of oil grooves 47 radially inwardly extending to the inner diameter edge portion of the frictional material 40. The oil grooves 47 comprise eight grooves formed independently radially and circumferentially equidistantly, but the number thereof can of course be set arbitrarily. Also, the circumferential width and radial length of the oil grooves 47 can of course be arbitrarily set as required.

FIGS. 6 and 7 are a front view and an axial cross-sectional view, respectively, of a piston 1 having a frictional material 40 attached thereto showing a third embodiment of the present invention. FIGS. 6 and 7 both show only one side of the piston 1 (cut in half at the center). As in the first embodiment, an annular frictional material 40 formed of a porous material or the like is attached and fixed, by a predetermined adhesive agent, to the annular surface 11 of the piston 1 which is opposed to the front cover 2 (see FIG. 1).

A non-cut surface 43 is formed with a plurality of oil grooves 48 radially inwardly extending to the inner diameter edge portion of the frictional material 40. The oil grooves 48 comprise eight grooves formed independently and circumferentially equidistantly substantially in the tangential direction of the center circle of the piston 1, but the number thereof can of course be set arbitrarily. Also, the circumferential width and radial length of the oil grooves 48 can of course be arbitrarily set as required.

Figure 9:
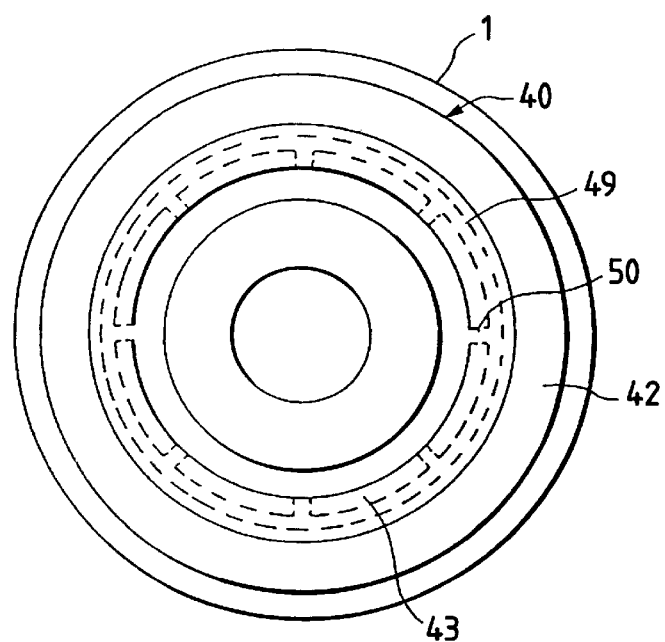
FIG. 9 is a front view of a piston 1 having a frictional material 40 attached thereto showing a fourth embodiment of the present invention.
Figure 10:
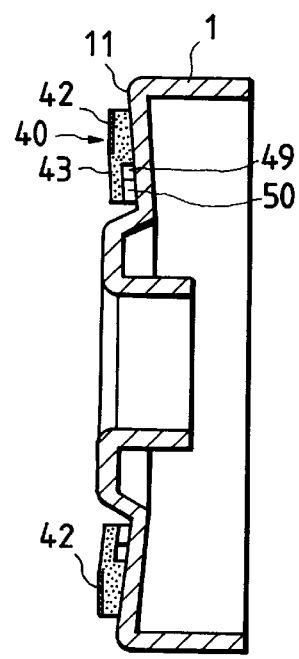
FIG. 10 is an axial cross-sectional view of the piston 1 having the frictional material 40 attached thereto showing the fourth embodiment of the present invention.

FIGS. 9 and 10 are a front view and an axial cross-sectional view, respectively, of a piston 1 having a frictional material 40 attached thereto showing a fourth embodiment of the present invention. An annular frictional material 40 formed of a porous material or the like is attached and fixed, by a predetermined adhesive agent, to the annular surface 11 of the piston 1 which is opposed to the front cover 2 (see FIG. 1).

That side of a non-cut surface 43 which is opposite to the front cover 2, i.e., that surface of the frictional material 40 which is adjacent to the surface 11 of the piston 1, is formed with a circumferentially continuously extending oil groove 49 and a plurality of oil grooves 50 connected to and communicating with the oil groove 49 and radially inwardly extending to the inner diameter edge portion of the frictional material 40. The oil grooves 50 comprise eight grooves formed radially and circumferentially equidistantly, but the number thereof can of course set arbitrarily. Also, the radial width of the oil groove 49 and the circumferential width and radial length of the oil grooves 50 can of course be arbitrarily set as required.

FIG. 15 is an axial cross-sectional view showing the state of a lock-up clutch in the fourth embodiment shown in FIGS. 9 and 10 during high hydraulic pressure. As shown, during high hydraulic pressure, the frictional material 40 bears against the front cover 2 with the inner diameter side thereof as the center. As this time, by the oil grooves 49 and 50 being provided in that side of the non-cut surface 43 of the frictional material 40 which is opposite to the front cover 2, as in each of the above-described embodiments, the distribution of hydraulic pressure in the radial direction and circumferential direction of the frictional material 40 created by hydraulic pressure coming around from the outer peripheral edge portion of the frictional material 40 to the friction surface between the front cover 2 and the frictional material 40 can be decreased during the operation (fastening) of the lock-up clutch at high hydraulic pressure. Accordingly, the piston thrust is increased. As a result, it becomes possible to prevent any reduction in transmission torque capacity during high hydraulic pressure.

The oil grooves 49 and 50 do not extend onto the cut surface 42 of the friction surface which is not subjected to cutting work. Accordingly, during slip control, the deficiency of the quantity of oil on the friction surface and the fluctuation of hydraulic pressure do not result and therefore, it is possible to maintain conventional heat resistance and judder resistance.

Figure 11:
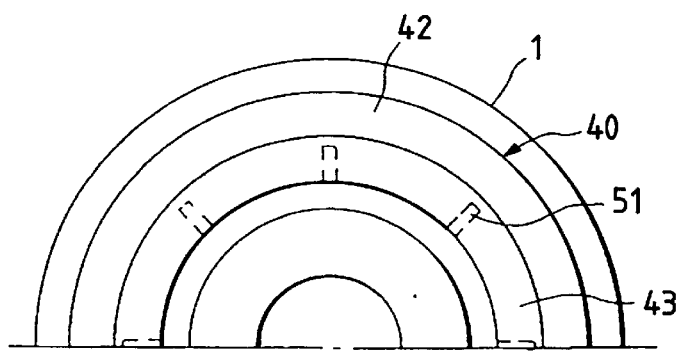
FIG. 11 is a front view of a piston 1 having a frictional material 40 attached thereto showing a fifth embodiment of the present invention.
Figure 12:
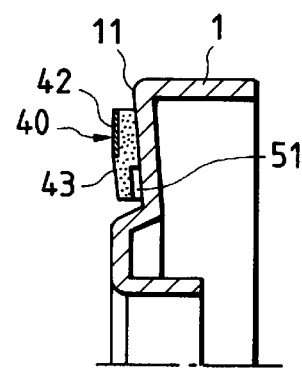
FIG. 12 is an axial cross-sectional view of the piston 1 having the frictional material 40 attached thereto showing the fifth embodiment of the present invention.

FIGS. 11 and 12 are a front view and an axial cross-sectional view, respectively, of a piston 1 having a frictional material 40 attached thereto showing a fifth embodiment of the present invention. FIGS. 11 and 12 both show only one side of the piston 1 (cut in half at the center). As in the first embodiment, an annular frictional material 40 formed of a porous material or the like is attached and fixed, by a predetermined adhesive agent, to the annular surface 11 of the piston 1 which is opposed to the front cover 2 (see FIG. 1).

That side of a non-cut surface 43 which is opposite to the front cover 2, i.e., the surface 11 side of the piston 1, is formed with a plurality of oil grooves 51 radially inwardly extending to the inner diameter edge portion of the frictional material 40. The oil grooves 51 comprise eight grooves formed independently radially and circumferentially equidistantly, but the number thereof can of course set arbitrarily. Also, the circumferential width and radial length of the oil grooves 51 can of course be arbitrarily set as required.

FIGS. 13 and 14 are a front view and an axial cross-sectional view, respectively, of a piston 1 having a frictional material 40 attached thereto showing a sixth embodiment of the present invention. FIGS. 13 and 14 both show only one side of the piston 1 (cut in half at the center). As in the first embodiment, an annular frictional material 40 formed of a porous material or the like is attached and fixed, by a predetermined adhesive agent, to the annular surface 11 of the piston 1 which is opposed to the front cover 2 (see FIG. 1).

That side of a non-cut surface 43 which is opposite to the front cover 2, i.e., the surface 11 side of the piston 1, is formed with a plurality of oil grooves 52 radially inwardly extending to the inner diameter edge portion of the frictional material 40. The oil grooves 52 comprise eight grooves formed independently and substantially in the tangential direction of the center circle of the piston 1 and circumferentially equidistantly, but the number thereof can of course be set arbitrarily. The circumferential width and radial length of the oil grooves 52 can also be arbitrarily set as required.

Figure 16:
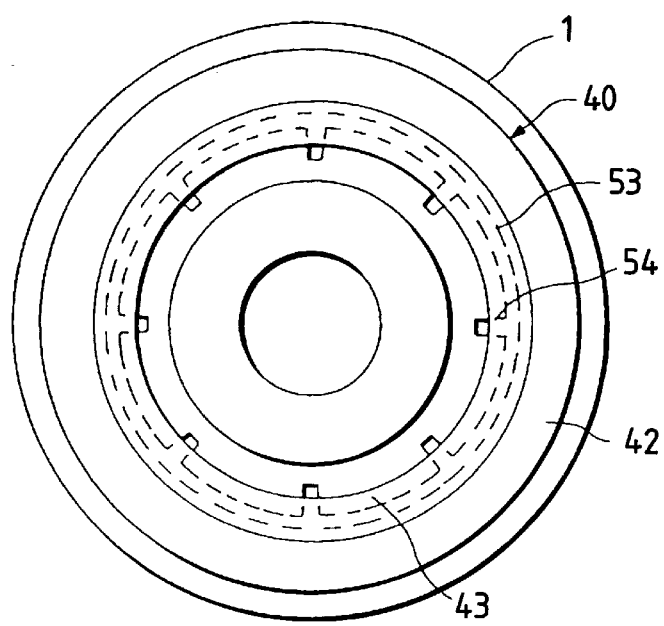
FIG. 16 is a front view of a piston 1 having a frictional material 40 attached thereto showing a seventh embodiment of the present invention.
Figure 17:
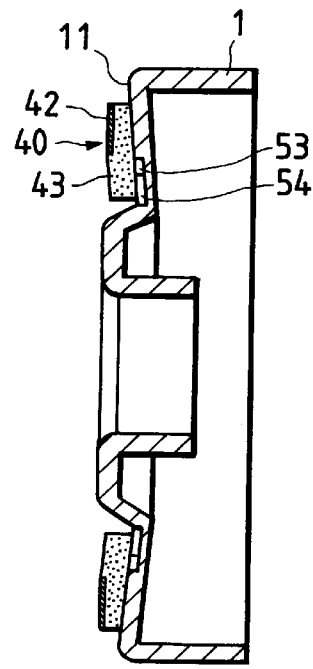
FIG. 17 is an axial cross-sectional view of the piston 1 having the frictional material 40 attached thereto showing the seventh embodiment of the present invention.

FIGS. 16 and 17 are a front view and an axial cross-sectional view, respectively, of a piston 1 having a frictional material 40 attached thereto showing a seventh embodiment of the present invention. An annular frictional material 40 formed of a porous material or the like is attached and fixed, by a predetermined adhesive agent, to the annular surface 11 of the piston 1 which is opposed to the front cover 2 (see FIG. 1).

In the seventh embodiment, the frictional material is formed without an oil groove, but the surface 11 of the piston 1 to which the frictional material 40 is attached and fixed is formed with oil grooves. The surface 11 of the piston 1 to which the frictional material 40 is attached and fixed is formed with a circumferentially continuously extending oil groove 53 and a plurality of oil grooves 54 connected to and communicating with the oil groove 53 and radially inwardly extending. The oil grooves 54 comprise eight grooves formed radially and circumferentially equidistantly, but the number thereof can of course be set arbitrarily. Also, the radial width of the oil groove 53 and the circumferential width and radial length of the oil grooves 54 can of course be arbitrarily set as required. Each of the oil grooves 54 is formed in the surface 11 from the oil groove 53 beyond the inner peripheral edge portion of the frictional material 40. Accordingly, a portion of the oil grooves 54 on the inner diameter side is not covered with the frictional material 40, but is exposed.

Also, as in other embodiments, the oil grooves 53 and 54 are formed in the surface 11 of the portion corresponding to the back side of the non-cut surface 43 of the frictional material 40.

FIG. 22 is an axial cross-sectional view showing the state of a lock-up clutch in the seventh embodiment shown in FIGS. 16 and 17 during high hydraulic pressure. As shown, during high hydraulic pressure, the frictional material 40 bears against the front cover 2 with the inner diameter side thereof as the center. At this time, by the oil grooves 53 and 54 being provided in the surface 11 of the piston 1 which is the back side of the non-cut surface 43 of the frictional material 40, as in the case of each of the above-described embodiments, the distribution of hydraulic pressure in the radial direction and circumferential direction of the frictional material 40 created by hydraulic pressure coming around from the outer peripheral edge portion of the frictional material 40 to the friction surface between the front cover 2 and the frictional material 40 can be decreased during the operation (fastening) of the lock-up clutch at high hydraulic pressure. Accordingly, the piston thrust is increased. As a result, it becomes possible to prevent any reduction in transmission torque capacity during high hydraulic pressure.

The oil grooves 53 and 54 do not extend on the cut surface 42 side of the friction surface which is subjected to cutting work. Accordingly, the deficiency of the quantity of oil on the friction surface and the fluctuation of hydraulic pressure do not result during slip control and therefore, it is possible to maintain conventional heat resistance and judder resistance.

Figure 18:
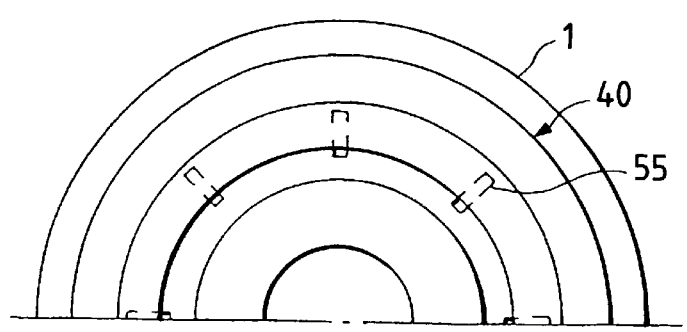
FIG. 18 is a front view of a piston 1 having a frictional material 40 attached thereto showing an eighth embodiment of the present invention.
Figure 19:
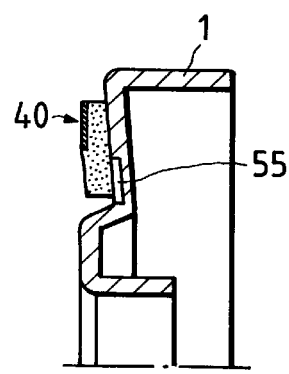
FIG. 19 is an axial cross-sectional view of the piston 1 having the frictional material 40 attached thereto showing the eighth embodiment of the present invention.
Figure 23:
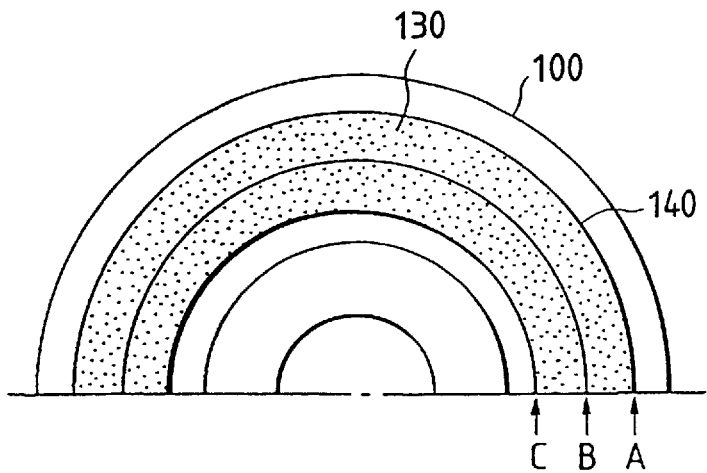
FIG. 23 is a front view of a piston having a frictional material attached thereto showing the construction of the friction surfaces of a frictional material and a piston according to the prior art.
Figure 24:
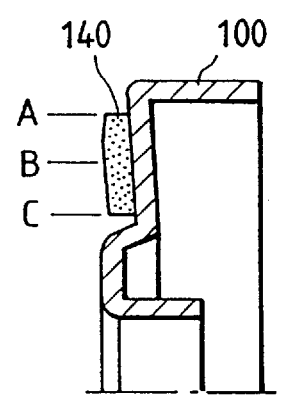
FIG. 24 is an axial cross-sectional view of the piston having the frictional material attached thereto showing the construction of the friction surfaces of the frictional material and the piston according to the prior art.
Figure 25:
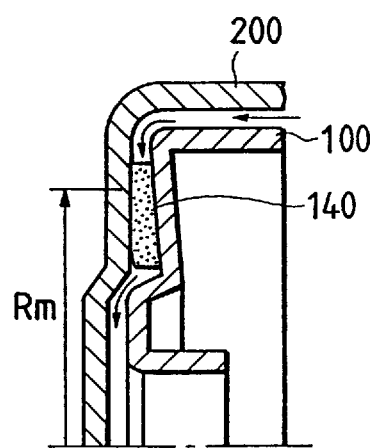
FIG. 25 is an axial cross-sectional view of the piston illustrating the manner in which the frictional material according to the prior art bears against a front cover during low pressure.
Figure 26:
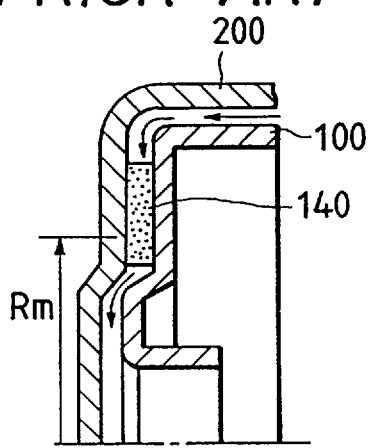
FIG. 26 is an axial cross-sectional view of the piston illustrating the manner in which the frictional material according to the prior art bears against the front cover during high pressure.

FIGS. 18 and 19 are a front view and an axial cross-sectional view, respectively, of a piston 1 having a frictional material 40 attached thereto showing an eighth embodiment of the present invention. FIGS. 18 and 19 both show only one side of the piston 1 (cut in half at the center). As in the first embodiment, an annular frictional material 40 formed of a porous material or the like is attached and fixed, by a predetermined adhesive agent, to the annular surface 11 of the piston 1 which is opposed to the front cover 2 (see FIG. 1).

In the present embodiment., the frictional material 40 is formed without an oil groove, but the surface 11 of the piston 1 to which the frictional material 40 is attached is formed with oil grooves. The surface 11 of the piston 1 which is the back side of a non-cut surface 43 is formed with a plurality of oil grooves 55 radially inwardly extending beyond the inner diameter edge portion of the frictional material 40. The oil grooves 55 comprise eight grooves formed independently radially and circumferentially equidistantly, but the number thereof can of course be set arbitrarily. Also, the circumferential width and radial length of the oil grooves 55 can of course be arbitrarily set as required.

FIGS. 20 and 21 are a front view and an axial cross-sectional view of a piston 1 having a frictional material 40 attached thereto showing a ninth embodiment of the present invention. FIGS. 20 and 21 both show only one side of the piston 1 (cut in half at the center). As in the first embodiment, an annular frictional material 40 formed of a porous material or the like is attached and fixed, by a predetermined adhesive agent, to the annular surface 11 of the piston 1 which is opposed to the front cover 2 (see FIG. 1).

In the present embodiment, the frictional material 40 is formed without an oil groove, but the surface 11 of the piston 1 to which the frictional material 40 is attached is formed with oil grooves. The back side of a non-cut surface 43, i.e., the surface 11 of the piston 1 which is opposite to the front cover 2, is formed with a plurality of oil grooves 56 radially inwardly extending beyond the inner diameter edge portion of the frictional material 40. The oil grooves 56 comprise eight grooves formed independently substantially in the tangential direction of the center circle of the piston 1 and circumferentially equidistantly, but the number thereof can of course be set arbitrarily. Also, the circumferential width and radial length of the oil grooves 56 can of course be arbitrarily set as required.

When, as in the seventh to ninth embodiments, the surface 11 of the piston 1 of the lock-up clutch to which the frictional material 40 is attached is formed with oil grooves, any reduction in the strength of the frictional material 40 does not result and therefore, it is possible to maintain conventional heat resistance and judder resistance.

Figure 27:
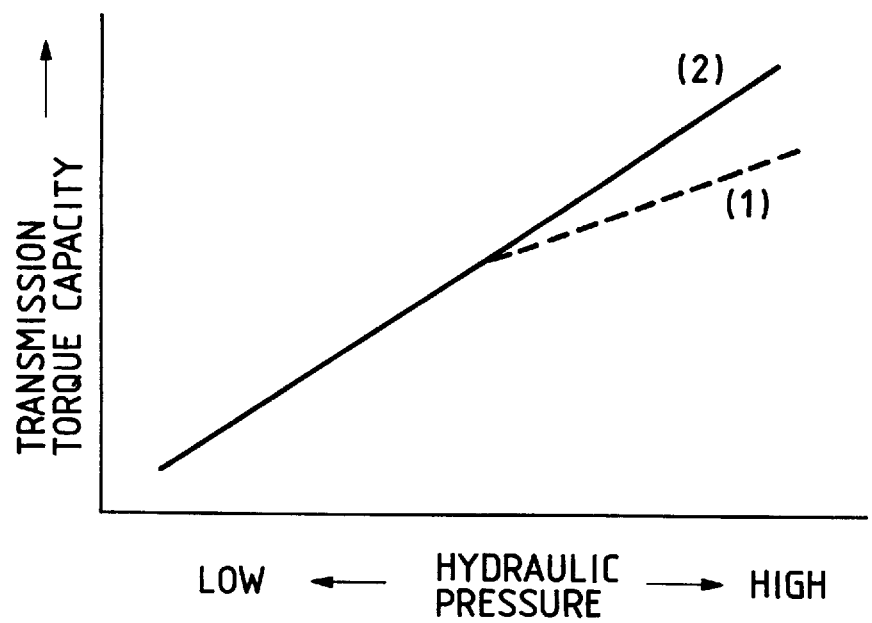
FIG. 27 is a graph showing the relation between the hydraulic pressure of the slip surface of a direct-coupled clutch and transmission torque capacity.

FIG. 27 is a graph showing the transmission torque capacities of a lock-up mechanism according to the prior art and a lock-up mechanism in each of the embodiments of the present invention. It can be seen from the graph that in the lock-up mechanism according to the prior art, as indicated by a broken line (1), the transmission torque capacity falls when the slip surface of the direct-coupled clutch reaches high hydraulic pressure, while according to each embodiment of the present invention, as indicated by a solid line (2), the transmission torque capacity does not fall even when the slip surface of the direct-coupled clutch reaches high hydraulic pressure..

While in each of the above-described embodiments, the frictional material 40 is provided only on one side of the piston 1, the present invention can also of course be applied to a direct-coupled clutch of the type in which the frictional material 40 is provided on the front cover 2 side and the frictional material 40 is provided on each side of the piston 1.

According to the above-described torque converter with a lock-up mechanism in accordance with the present invention, there is obtained such an effect as will hereinafter be described.

The friction surface of the radially outer portion of the frictional material is subjected to cutting work and the radially inner portion of the frictional material which is not subjected to cutting work is provided with hydraulic pressure distribution reducing means for reducing the distribution of hydraulic pressure created around the frictional material and therefore, during the operation of the lock-up clutch at high hydraulic pressure, the distribution of hydraulic pressure in the radial direction and circumferential direction of the frictional material created by hydraulic pressure coming around from the outer peripheral portion of the frictional material into and between the friction surfaces is decreased and the piston thrust is increased. As a result, it becomes possible to prevent any reduction in transmission torque capacity during high hydraulic pressure. Accordingly, an improvement in fuel consumption can be expected.

What is claimed is:

1. A torque converter with a lock-up mechanism provided with a direct-coupled clutch displaceable between a fastened state and a liberated state and slip-controllable, and a torque converter body for transmitting power by a fluid, characterized in that a frictional material is fixed to an axial pressure contact surface of a piston of said direct-coupled clutch, a friction surface of a radially outer portion of said frictional material has been subjected to cutting work, and hydraulic pressure distribution reducing means for reducing a distribution of hydraulic pressure created around said frictional material is provided on a radially inner portion of said frictional material which has not been subjected to cutting work.

2. A torque converter with a lock-up mechanism according to claim 1, characterized in that said hydraulic pressure distribution reducing means includes an oil groove formed in a surface of said frictional material which is adjacent to a front cover.

3. A torque converter with a lock-up mechanism according to claim 1, characterized in that said hydraulic pressure distribution reducing means includes an oil groove formed in a surface of said frictional material which is adjacent to the pressure contact surface of said piston.

4. A torque converter with a lock-up mechanism provided with a direct-coupled clutch displaceable between a fastened state and a liberated state and slip-controllable, and a torque converter body for transmitting power by a fluid, characterized in that a frictional material is fixed to an axial pressure contact surface of a piston of said direct-coupled clutch, a friction surface of a radially outer portion of said frictional material has been subjected to cutting work, and hydraulic pressure distribution reducing means for reducing a distribution of hydraulic pressure created around said frictional material is provided on said axial pressure contact surface of said piston substantially in juxtaposition to said frictional material and disposed so as not to overlap said outer portion of said frictional material in a radial direction.

5. A torque converter with a lock-up mechanism according to claim 4, characterized in that said hydraulic pressure distribution reducing means includes an oil groove formed in said axial pressure contact surface of said piston.

* * * * *